3,168,503
NOVEL DIALKENYL HETEROCYCLIC AMINE COMPOUNDS AND THEIR POLYMERIZATION
Walter E. Kramer, Niles, and Louis A. Joo, Crystal Lake, Ill., assignors to The Pure Oil Company, Chicago, Ill., a corporation of Ohio
No Drawing. Filed Mar. 31, 1961, Ser. No. 99,721
16 Claims. (Cl. 260—88.3)

This invention relates to new and useful nitrogen-containing dimers and polymers derived from metal amides produced by reaction of an alkali metal with a heterocyclic aromatic amine, such as pyridine, quinoline, acridine, etc., followed by reaction of the resulting product with an alkenyl monohalide.

During the period from 1914 to about 1921, there were reported in the literature the results of experimental work by Bruno Emmert on the reactions of pyridine with the alkali metals. Typical reports of this work are found in Berichte, 47, 2598 (1914); 49, 1060 (1916); 50, 31 (1917); 52, 1351 (1919); 53, 370 (1920); and 54, 204 (1921). In these publications, Emmert reported that sodium will react with pyridine to produce a disodium-dipyridyl compound. Emmert also reported the formation of similar compounds by reaction of sodium with other aromatic heterocyclic amines, such as quinoline, acridine, and the like. In the copending application of Walter E. Kramer, Louis A. Joo, and Robert M. Haines, Serial No. 28,866, filed May 13, 1960, a process is described in which a variety of dialkali metal amides are formed by reaction of alkali metals with aromatic heterocyclic amines, which compounds are converted to dibasic acid salts by reaction with carbon dioxide. The dibasic acids which are formed, and various salts and derivatives thereof, are novel compounds previously not isolated. This invention is concerned with the preparation of unsaturated diamines and polyamine resins from the alkali metal dipyridyl compounds and their analogs which are described in the aforementioned copending patent application of Kramer et al.

One of the objects of this invention is the provision of a novel process for the preparation of novel dimers and polymers from aromatic heterocyclic amines.

Another object of this invention is the provision of a novel class of dialkenyl amines derived from aromatic heterocyclic amines, and resinous polymers produced upon polymerization of said alkenyl amines.

A feature of this invention is the provision of a process in which metal amides, prepared by reaction of alkali metals with aromatic heterocyclic amines, are reacted with alkenyl halides to produce a novel class of dialkenyl amines.

Another feature of this invention is the provision of a process in which dialkenyl amines derived from aromatic heterocyclic amines are polymerized to produce a novel class of polyamine resins.

A further feature of this invention is the provision of a novel class of dialkenyl amines produced by reaction of alkali metal diamides of aromatic heterocyclic amines with alkenyl halides in an inert solvent at a temperature from 0° C. to the reflux temperature of the halide, preferably about 0° to 75° C.

Still another feature of this invention is the provision of a novel class of polyamine resins produced by polymerization of dialkenyl amines derived from aromatic heterocyclic amines.

Other objects and features of this invention will become apparent from time to time throughout the specification and claims as hereinafter related.

This invention is based upon the discovery that certain compounds of the type described by Emmert, and described in the aforementioned copending patent application of Kramer et al., may be utilized in the preparation of novel dialkenyl amines and novel polyamine resins. In our invention, alkali metals, such as sodium, potassium, lithium, etc., and mixtures thereof, such as sodium-potassium alloys, are reacted with heterocyclic aromatic amines, such as pyridine, quinoline, acridine, and the like, to form intermediate diamides of the formula:

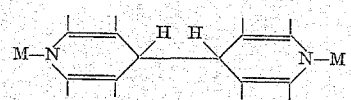

where M is an alkali metal, and the nitrogen-containing nuclei are derived from a heterocyclic aromatic amine. The intermediate diamide which is formed is reacted in suspension or solution in an inert solvent or diluent (a liquid which is inert toward the reactants and products under the conditions of reaction), at a temperature in the range of about 0° to 75° C., with an alkenyl halide. In this reaction, an alkali metal halide precipitates as a by-product and is filtered off. There remains in solution a dialkenyl amine of the formula:

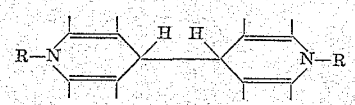

where R is an alkenyl radical, preferably containing from about 2 to 20 carbon atoms.

In preparing the novel compounds of this invention, a dispersion of an alkali metal, such as sodium, lithium, potassium, or sodium-potassium alloys, is formed in an inert liquid. The solvent or reaction medium used is preferably a mineral oil, such as a white oil, although other inert solvents or diluents can be used, such as hydrogenated aromatic extracts of mineral oils, xylene, and ethers and acetals, such as diethyl ether, dipropyl ether, dioctyl ether, dimethoxyethane, methylal, dimethyl ether of diethylene glycol, dimethyl ether of tetraethylene glycol, dimethyl sulfoxide, etc. When liquid sodium-potassium alloys are used, a mixed sodium-potassium product is obtained and in some instances the solvent may be eliminated. The dispersion of the alkali metal in the inert solvent is then added to an aromatic heterocyclic amine, such as pyridine, quinoline, acridine, or derivatives thereof containing only inert substituents, e.g., picoline, lutidine, esters or salts of nicotinic acid, 2-benzylpyridine, 2,3,6-collidine, etc., while maintaining the reaction at a relatively low temperature, e.g., −50° to +100° C., preferably +50 to +100° C. Under these conditions, the alkali metal reacts with the aromatic heterocyclic amine, i.e., adds at the nitrogen atom, with the result that the aromatic amine dimerizes and there is formed a di-alkali metal amide of the aromatic amine dimer. In the case of pyridine and sodium, the reaction is as follows:

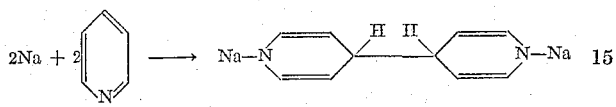

Since this reaction is one which takes place with all of the aromatic heterocyclic amines, we report the general reaction as follows:

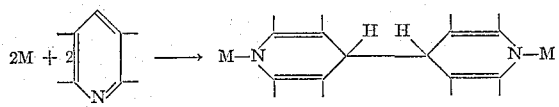

where M is an alkali metal, and

represents the nucleus of an aromatic heterocyclic amine.

After the intermediate alkali metal diamide of the aromatic amine is formed, it is reacted in suspension or solution with a monohalo-alkene, preferably a $C_2$–$C_{20}$ alkenyl monohalide. In carrying out this reaction, any inert solvent can be used which is unreactive toward the reactants and which has physical properties which make it generally suitable as a reaction medium. Any of the solvents used in the preparation of the intermediate diamide may be used in the reaction which produces the product dialkenyl amines. The reaction is carried out at a temperature in the range from 0° C. to the reflux temperature of the alkenyl monohalide, and is preferably carried out at temperatures in the range from about 0° to 75° C. Alkenyl monohalides which can be used and which are illustrative of the scope of this reaction include vinyl chloride, vinyl bromide, vinyl iodide, 3-chloropropene, 3-bromopropene, 4-chloro-2-butene, 5-bromo-3-pentene, 1-chloro-2-octene, 1-chloro-12-octadecene, 1-bromo-12-eicosene.

The product dialkenyl amine, derived from an aromatic heterocyclic amine, can be obtained in a pure form by a variety of product purification techniques. The product may be recovered by extraction or by fractional crystallization, by stripping out the solvent and washing out impurities, or by converting the product to a water-soluble derivative, followed by extraction with water and reconversion of the derivative to the water-insoluble product.

The following non-limiting examples are illustrative of the scope of this invention:

EXAMPLE I

A sodium dispersion in white oil was prepared by dispersing 11.5 g. of sodium in 150.0 g. of white oil. After the dispersion had been cooled to room temperature, 232 g. of 2-picoline were added whereupon the solution turned yellow and subsequently turned black. The reaction mixture was stirred for six hours while its temperature was maintained at 95° C. Then, 50 ml. of 3-chloropropene were added, drop-wise, while stirring was continued. After the reaction had gone substantially to completion, the unreacted 2-picoline was distilled off, and the mixture was acidified with hydrochloric acid. The resulting aqueous phase, containing the amine hydrochloride salt, was separated and neutralized with sodium hydroxide. An oily product immediately separated from the water and was purified by vacuum distillation to obtain a substantially quantitative yield of dipropenyl tetrahydrodipicolyl,

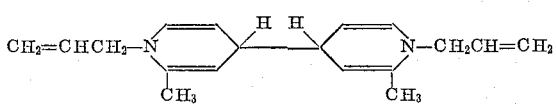

The product was a viscous oil when first prepared. Upon standing in a closed container, its viscosity continued to increase, because of polymerization through the double bonds, and it soon became a semi-solid. After extended storage, or upon treatment with a polymerization initiator, such as benzoyl peroxide, this product is converted into a solid resin. A portion of this product was mixed with 0.04% of 4-tert-butyl catechol, as a polymerization inhibitor, and was stable, without change in viscosity, after several weeks storage. The resin which is obtained upon polymerization of the dipropenyl tetrahydro-dipicolyl is useful as a structural resin, as a coating, as an ingredient of paints and coating compositions, as an ion-exchange resin, and as a copolymer in polystyrene or acrylonitrile resins.

EXAMPLE II

A sodium dispersion is prepared by heating two mols (45 g.) of sodium and 500 g. of xylene above the melting point of sodium with agitation. The dispersion is then cooled to about 50° C. and 300 ml. of pyridine are added, whereupon the solution turns first yellow and then black. After heating for about 4–6 hours at 50° C., two mols of 3-chloropropene are added drop-wise, while stirring is continued. After all of the halide has been added, the mixture is stirred for an additional four hour period to assure completion of reaction. The unreacted pyridine is distilled off, and the mixture is acidified with hydrochloric acid. The resulting aqueous phase containing the amine hydrochloride salt is separated and neutralized, whereupon the product separates from the water. The product which is obtained in this manner is dipropenyl tetrahydro-dipyridyl,

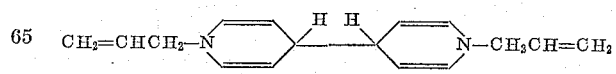

When the procedure of Examples I and II is repeated, substituting other alkali metals, heterocyclic amines, and alkenyl halides for the ones used in those examples, dialkenyl amines of the same type are obtained. Examples of such reactants and the products obtained are set forth in Table I.

Table 1

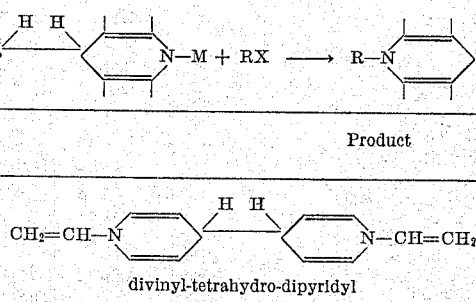

| M | Amine | Solvent | Alkenyl Halide | Product |
|---|---|---|---|---|
| Na | Pyridine | Xylene | Vinyl Chloride | $CH_2=CH-N\underset{\text{divinyl-tetrahydro-dipyridyl}}{\text{(ring)}}N-CH=CH_2$ |
| K | Quinoline | White Oil | 3-chloropropene | $CH_2=CH-CH_2-N\underset{\text{diallyl-tetrahydrodiquinolyl}}{\text{(ring)}}N-CH_2-CH=CH_2$ |
| Li | Acridine | White Oil | 4-chloro-2-butene | $CH_3-CH=CH-CH_2-N\underset{\text{dicrotyl-tetrahydrodiacridyl}}{\text{(ring)}}N-CH_2-CH=CH-CH_3$ |
| Na-K eutectic | 2,6-lutidine | Benzene | 6-chloro-3-hexene | $CH_3-CH_2-CH=CH-CH_2-CH_2-N\underset{\text{di-(3-hexenyl)-tetrahydro-di(2,6-lutidyl)}}{\text{(ring)}}N-CH_2-CH_2-CH=CH-CH_2-CH_3$ |
| Na | Pyridine | n-Butyl ether | 1-chloro-12-octadecene | $(CH_2)_{11}-CH=CH-(CH_2)_5-N\underset{\text{dioctadecenyl-tetrahydro-dipyridyl}}{\text{(ring)}}N-(CH_2)_5-CH=CH-(CH_2)_{11}$ |
| Na | 2-benzyl Pyridine | Methylal | 3-chloropropene | $CH_2=CH-CH_2-N\underset{\text{diallyl-tetrahydro-2-2' dibenzylpyridyl}}{\text{(ring)}}N-CH_2-CH=CH_2$ |
| K | Pyridine | Dimethoxy ethane | 3-bromopropene | Diallyl tetrahydro-dipyridyl. |
| Na | do | Dimethyl Sulfoxide | 3-iodopropene | Do. |

In each case the product obtained in the manner described in Table I is a dialkenyl amine derived from the heterocyclic aromatic amine reactant. The dialkenyl amine is a useful intermediate in the preparation of resins and coatings. These amines may be stabilized by use of conventional polymerization inhibitors. If allowed to stand without addition of a polymerization inhibitor, these amines polymerize to semi-solids and eventually to hard solid resins. These resins may be plasticized with standard plasticizers, such as tricresyl phosphate, dioctyl phthalate, etc., and used as structural resins. These resins may also be used as coatings and as ingredients of coating compositions. Additionally, these resins are useful as ion-exchange resins.

While we have described our invention fully and completely with special emphasis on several preferred embodiments thereof, we wish it to be understood that other reactants within the general classes of reactants set forth above may be utilized in our process for the preparation of the novel amine intermediates and the novel polyamine resins which we have discovered. We, therefore, wish it to be understood that, within the scope of the appended claims, this invention may be practiced otherwise than as specifically described herein.

The embodiments of the invention in which an exclusive property or privilege is claimed are as follows:

1. Compounds of the formula:

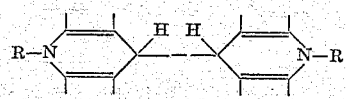

where R is a $C_2$-$C_{20}$ alkenyl radical and

represents a radical selected from the group consisting of

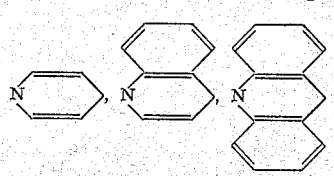

and lower alkyl-substituted derivatives thereof.

2. Resinous homopolymers of compounds defined in claim 1.

3. Compounds of the formula:

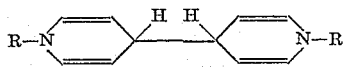

where R is a $C_2$–$C_{10}$ alkenyl radical.

4. Compounds of the formula:

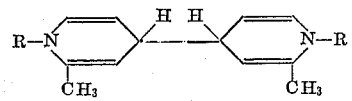

where R is a $C_2$–$C_{20}$ alkenyl radical.

5. Compounds of the formula:

where R is a $C_2$–$C_{20}$ alkenyl radical.

6. Compounds of the formula:

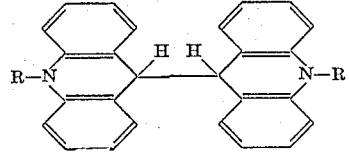

where R is a $C_2$–$C_{20}$ alkenyl radical.

7.

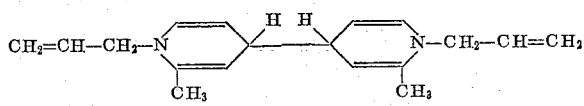

8. A method of preparing diamines which comprises reacting a $C_2$–$C_{20}$ alkenyl monohalide with a compound of the formula:

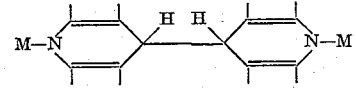

where M is an alkali metal and

represents a radical selected from the group consisting of

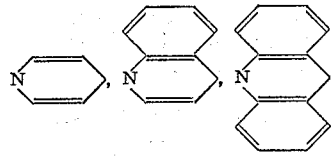

and lower alkyl-substituted derivatives thereof, at a temperature in the range from about 0° C. to the reflux temperature of the alkenyl halide.

9. A method in accordance with claim 8 in which the reaction is carried out in an inert liquid.

10. A method in accordance with claim 8 in which M is selected from the group consisting of sodium, potassium, and mixtures thereof.

11. A method in accordance with claim 8 in which the product is recovered by acidification, extraction with water, and neutralization with a base.

12. A method in accordance with claim 8 in which the product diamine is polymerized and a polyamine resin recovered.

13. A method of preparing diamines which comprises reacting a $C_2$–$C_{20}$ alkenyl monohalide with a compound of the formula:

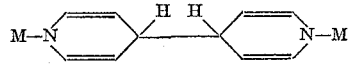

where M is an alkali metal, at a temperature from about 0° C. to the reflux temperature of said alkenyl halide.

14. A method of preparing diamines which comprises reacting a $C_2$–$C_{20}$ alkenyl monohalide with a compound of the formula:

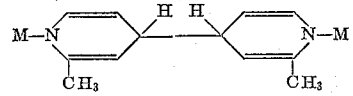

where M is an alkali metal, at a temperature from about 0° C. to the reflux temperature of said alkenyl halide.

15. A method of preparing diamines which comprises reacting a $C_2$–$C_{20}$ alkenyl halide with a compound of the formula:

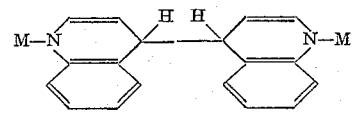

where M is an alkali metal, at a temperature from about 0° C. to the reflux temperature of said alkenyl halide.

16. A method of preparing diamines which comprises reacting a $C_2$–$C_{20}$ alkenyl halide with a compound of the formula:

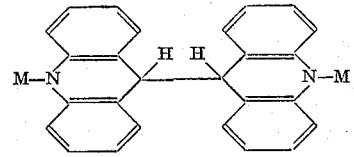

where M is an alkali metal, at a temperature from about 0° C. to the reflux temperature of said alkenyl halide.

References Cited by the Examiner

UNITED STATES PATENTS

| | | | |
|---|---|---|---|
| 2,762,809 | 9/56 | Steck | 260—279 |
| 2,854,457 | 9/58 | Cislak | 260—296 |
| 2,938,017 | 5/60 | Grosser | 260—88.3 |
| 2,947,736 | 8/60 | Lundberg | 260—88.3 |
| 3,020,283 | 2/62 | Schock et al. | 260—288 |

OTHER REFERENCES

Emmert et al.: Chemische Berichte, vol. 54, pages 204–9 (1921).
Michalski et al.: Chem Abst., vol. 54, cols. 3047–8 (1960).
Homer et al.: Chem Abst., vol. 54, col. 21602 (1960).

LEON J. BERCOVITZ, Primary Examiner.

J. MARCUS, E. YOUNG, D. M. BUTCHER, J. R. LIBERMAN, Examiners.

UNITED STATES PATENT OFFICE
CERTIFICATE OF CORRECTION

Patent No. 3,168,503                                           February 2, 1965

Walter E. Kramer et al.

It is hereby certified that error appears in the above numbered patent requiring correction and that the said Letters Patent should read as corrected below.

Column 7, line 8, for "$C_2-C_{10}$" read -- $C_2-C_{20}$ --.

Signed and sealed this 6th day of July 1965.

(SEAL)
Attest:

ERNEST W. SWIDER                                       EDWARD J. BRENNER
Attesting Officer                                            Commissioner of Patents